Figure 1:
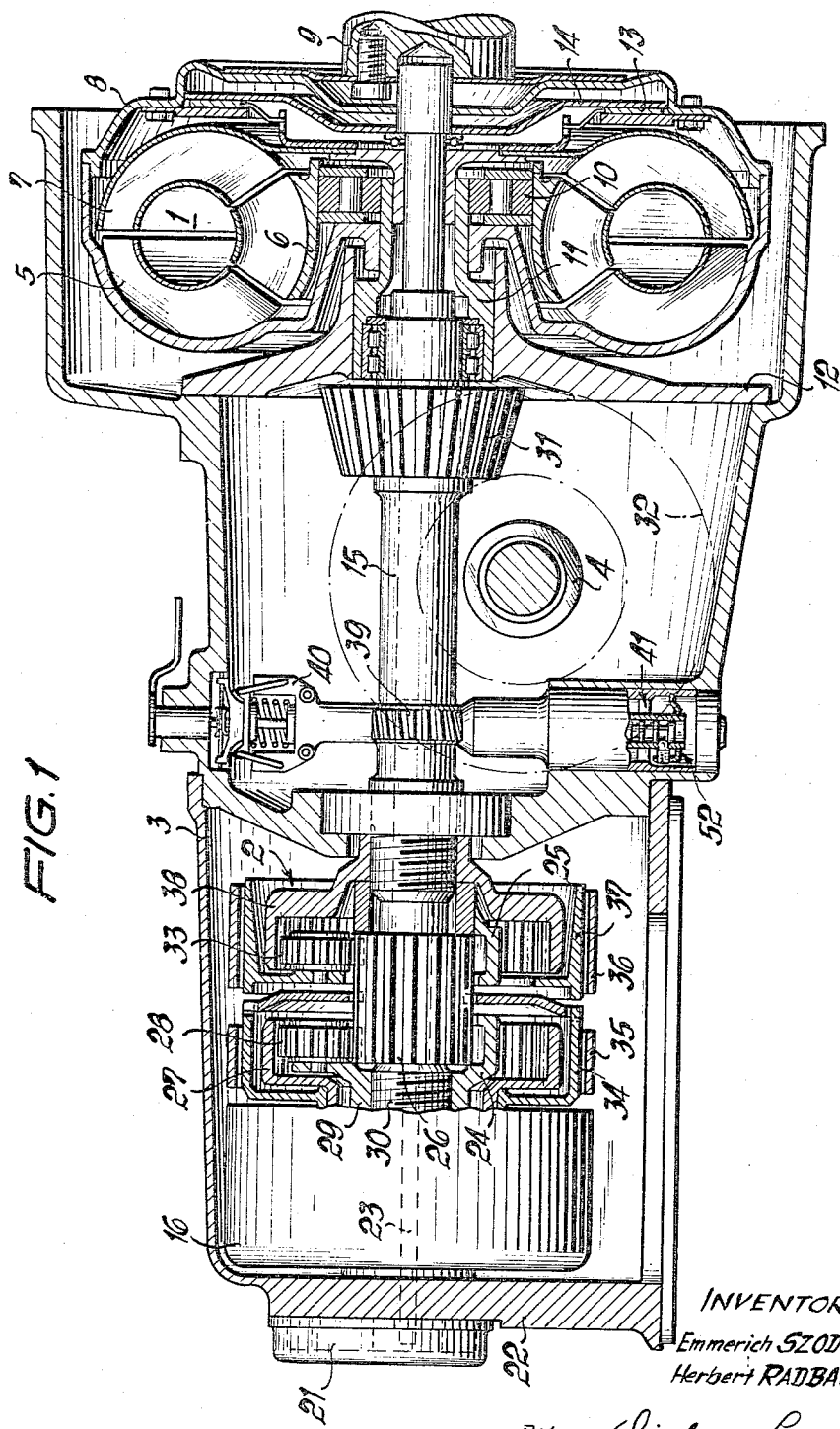

United States Patent Office 3,313,173
Patented Apr. 11, 1967

3,313,173
AUTOMATIC CONTROL SYSTEM FOR
CHANGE-SPEED GEARS
Emmerich Szodfridt, Ditzingen, and Herbert Radbauer, Stammheim, Germany, assignors to Firma Dr.-Ing. h.c.F. Porsche KG, Stuttgart-Zuffenhausen, Germany
Filed May 17, 1965, Ser. No. 456,206
Claims priority application Germany, May 23, 1964,
P 34,322
11 Claims. (Cl. 74—472)

The present invention relates to an automatic control system for a multi-speed or multi-step change-speed transmission of vehicles adapted to be shifted without causing an interruption in the driving force, especially for hydrodynamic combination transmissions of motor vehicles, which includes two concentric, relatively movable control members, of which one control member is under the influence of a centrifugal governor dependent on the rotative speed of the transmission and the other control member is under the influence of the output or power regulating member of an internal combustion engine.

With the known automatic control devices of this kind, the shifting control operation in dependence on the existing driving resistance, on the one hand, and the engine load, on the other, presents considerable difficulties for multi-speed change-speed gears. Particularly by reason of the fact that in the design of the individual shifting members for a driving-technical and economically favorable balanced condition, a large number of control magnitudes and control factors have to be considered, a considerable number of expensive shifting and control elements are necessary in the prior art systems, the matching of which for certain drive ranges additionally requires the active participation and influence of the driver. These prior art devices operate for the most part with pressure differential controls in such a manner that for each of the various transmission ratios or speed steps, a certain corresponding shifting pressure is built up. At the same time, precautions must be taken to avoid alternating shifting oscillations or hunting between two gear speeds or transmission ratios since such shifting operations produce considerable wear on the shifting members.

According to the present invention, these disadvantages are avoided in that one control member, preferably the one connected with the centrifugal governor, regulates in a step-like manner in relation to the other control member the pressure fluid supply to the adjusting piston associated with the speed selector valve of the system against the action of a transmitter member influenced by the rotating speed of the transmission as well as by the position of the output regulating member which adjusting piston is held in equilibrium at least in one effective shifting position, while acted upon on both sides thereof. With this construction of the control system, the operating values or magnitudes at the input side and output side of the drive unit are applied to a single transmitter member which accomplishes the step-like shifting of the control member only with a predetermined resultant adjusting force. It is thereby assured that a shifting impulse is only given to the speed selector slide valve when a lasting influence magnitude requires a change in transmission ratio of the change-speed gear both from a drive-technical consideration as well as also in view of the operational behavior of the engine.

By reason of the fact that the control members are form-lockingly connected with each other in the axial direction by a bridgeable detent device and in the circumferential direction by a connecting linkage operatively connected with the engine output control member, all of the factors depending on the operating values or magnitudes may be embraced thereby so that the individual shifting members of the change-speed gear are adapted to be acted upon with the pressure medium directly from the speed selector valve. The detent means preferably consists of a detent ball extending through the slide valve member controlled in dependence on the power output and of a spring, which is guided within a movable housing and is supported at a cam-like control surface influencing the spring-load of the detent ball. It is possible thereby in a simple manner to change the response point of the control system corresponding to the engine load in time in such a manner that the change of the transmission ratio conditions—starting from the normal shifting program—takes place earlier or later and additionally to adjust the hysteresis of the control system, that is, the matching of the shifting points in such a manner that the change to a higher speed or gear of the transmission is subjected to a different rule or mathematical interrelationship than the change to a lower speed or gear. The arrangement is preferably selected in such a manner that the cam-like control surface is provided with a spiral-like groove in which is guided a bracket form-lockingly connected to the control member actuated in dependence on the engine power output, which bracket holds the housing of the detent device in position in relation to the control surface.

The transmitter member is preferably constituted by a leaf spring lamella or disk connected to one of the control members, the springy ends of which engage with the centrifugal governor body by means of a fork-like coupling body. The leaf spring lamella or disk preferably engages the linkage of the control members in such a manner that the coupling body associated therewith is adapted to be connected directly with the centrifugal governor. It is achieved thereby that always the actual control or influencing magnitudes are effective in the control system without an oversensitive reacting or response on the part of the control system.

Accordingly, it is an object of the present invention to provide an automatic control system for muliti-speed change speed transmissions of motor vehicles which is simple in construction yet obviates the aforementioned shortcomings encountered with the prior art systems.

Another object of the present invention resides in the provision of an automatic control system of multi-speed change-speed transmissions which permits a completely satisfactory automatic control of the transmission, taking into consideration all pertinent factors without involving a large number of expensive shifting and control elements.

A further object of the present invention resides in the provision of automatic control system for multi-speed change-speed transmissions of the type described above which is completely automatic, extremely reliable in operation, and avoids hunting between two transmission ratios.

Still another object of the present invention resides in a control system for multi-speed change-speed transmissions which effectively minimizes wear in the various elements thereof, thus extending the useful length of life of the system.

Another object of the present invention resides in the provision of an automatic control system for multi-speed change-speed gears which produces a shifting operation only in the presence of a relatively long-lasting control magnitude while at the same time permitting a substantial simplification in requiring only a single transmitter element.

A further object of the present invention resides in the provision of an automatic control system for automatic multi-speed change-speed gears which enables using simple design considerations, a shifting program that differs in shifting to the higher and lower speeds, respectively.

Another object of the present invention resides in the provision of an automatic control system for multi-speed change-speed gears which not only embraces all factors dependent on the operating magnitudes that are of importance to the driving characteristics and proper operation, but also permits by simple means to change the response point of the control system for changing from one speed to the next.

Figure 2:
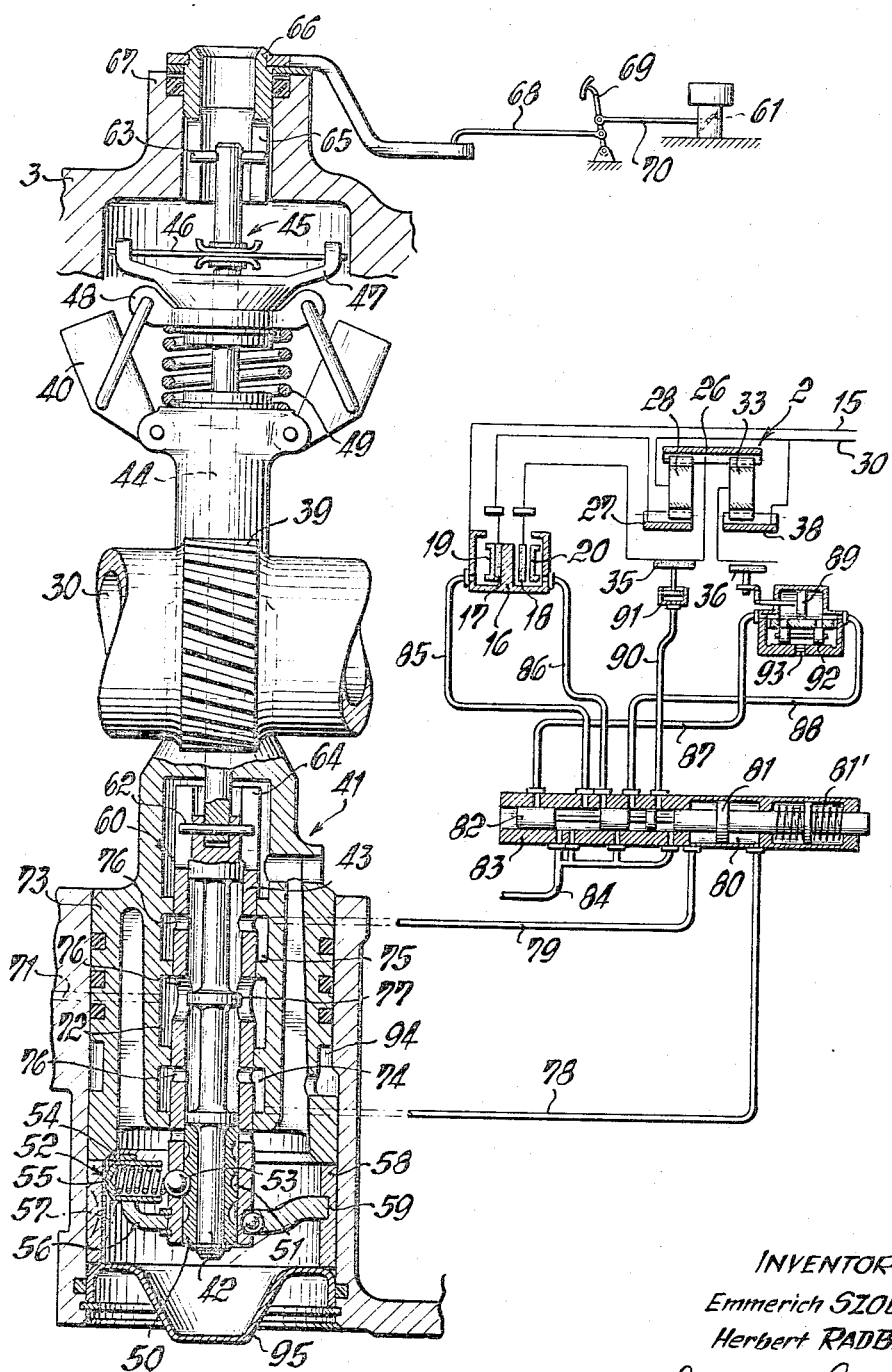

These and further objects, features and advantages of the present invention will become more obvious from the following description when taken in connection with the accompanying drawing, which shows, for purposes of illustration only, one embodiment in accordance with the present invention, and wherein:

FIGURE 1 is a simplified center longitudinal cross sectional view through a multi-speed hydrodynamic combination transmission for a motor vehicle provided with a control system in accordance with the present invention, and FIGURE 2 is a center longitudinal cross sectional view through the control system according to FIGURE 1, on an enlarged scale, and with the schematically illustrated shifting members of the change-speed gear in an effective shifting position.

Referring now to the drawings wherein like reference numerals are used throughout the two views to designate like parts, the combination transmission illustrated therein consists of a torque converter 1 and a planetary gear generally designated by reference numeral 2 connected in the output of the torque converter 1. The differential gear 4 (not shown in detail) is arranged between the torque converter 1 and the planetary gear 2 within a common housing 3. The torque converter 1 includes, in a known manner, a pump wheel 5, a guide wheel 6 as well as a turbine wheel 7. The pump wheel 5 is in driving connection with the crankshaft 9 of an internal combustion engine by way of a bell-shaped driving member 8. The guide wheel 6 is supported by way of a freewheeling device 10 at a stationary part 11 of the torque converter housing end plate 12. The turbine wheel 7 is adapted to be connected with the bell-shaped driving member 8 by means of a friction disk clutch 13 which bridges the torque converter 1. An annular piston 14 is provided for actuating the clutch 13 which piston 14 is slidably arranged within the bell-shaped driving member 8. The turbine wheel 7 is connected with the drive or input shaft 15 of the planetary gear 2 disposed coaxially to the crankshaft 9. The driving shaft 15 extends through the transmission 2 and is in engagement at its free end with a common input drum 16 for two multi-disk or lamellae clutches 17 and 18 (FIGURE 2). Two actuating pistons 19 and 20 are provided for operating the multi-disk clutches 17 and 18, and are acted upon by a pressure medium supplied from a supply pump 21. The supply or booster pump 21 is flangedly connected to one end face 22 of the transmission housing 3 and is driven from the bell-shaped driving member 8 at the speed of the engine by a shaft 23 extending through the transmission input shaft 15.

The multi-disk clutches 17 and 18 serve for producing three forward speeds and one reverse speed by means of the planetary gear transmission 2. The planetary gear transmission 2 comprises, for this purpose, two planetary gear sets 24 and 25 of identical dimensions including a common sun gear 26. The ring gear 27 of the planetary gear set 24 is adapted to be connected with the multi-disk clutch 17 and is in engagement with the planet gears 28 which are supported by a planet carrier 29 which is in driving connection with the transmission output shaft 30. The transmission output shaft 30 is supported within the gear housing 3 concentrically to the transmission input shaft 15 and is provided with a drive pinion 31. The drive to the rear wheels of the vehicle is derived from the output pinion 31 which is supported in the converter housing end plate 12 by way of the spur bevel gear 32 (shown in dot and dash lines) of the differential gear 4. The planet gears 33 of the planetary gear set 25 as also the planet gears 28 of the planetary gear set 24 are in engagement with the common sun gear 26. The sun gear 26 is adapted to be clutched to the multi-disk clutch 18 by means of the brake drum 34 which surrounds the planetary gear set 24. The brake drum 34 is surrounded by a band brake 35. A further band brake 36 surrounds the carrier 37 of the planet gears 33 which mesh with a ring gear 38 which, in turn, is connected with the transmission output shaft 30. The transmission output shaft 30 is provided with a worm gear 39 which serves as the drive means for the centrifugal governor 40.

A control mechanism generally designated by reference numeral 41 is associated with the centrifugal governor 40 (FIGURE 2), which control mechanism serves for the automatic shifting of the individual speed steps or transmission ratios of the planetary gear. The control device 41 consists of two control pistons or slide valve members 42 and 43 arranged concentrically to one another. The control piston 42 is connected with a transmitter member 45 by way of a linkage 44, which transmitter member 45 consists of a leaf-spring lamella or disk 46, the free ends of which engage by means of a fork-shaped coupling body 47 at the abutment 48 of the control spring 49. A sleeve 50 is mounted over the opposite end of the inner control piston 42 which sleeve 50 is provided with a number of grooves 51 corresponding to the number of forward speeds. A detent device 52 is associated with the grooves 51; the detent device 52 form-lockingly connects the control pistons 42, 43 in the axial direction. The locking or detent device 52 consists of a ball 53, of a compression spring 54 as well as of a housing 55 which houses the spring 54. The housing 55 is arranged radially to the axis, while the control slide valve assembly 42 and 43 is movably guided in a bracket 56 and supports itself at the cam-like control surface 57 on a bushing 58. The bracket 56 is form-lockingly connected with the outer control piston or slide valve member 43 and is guided in a spirally shaped groove 59 provided within the bushing 58. The end 60 of the outer control piston or slide valve member 43 disposed opposite the bracket 56, is rotatably connected with the power or output control member 61 of the schematically indicated internal combustion engine, by means of a connecting linkage 44. For this purpose, the connecting linkage 44 extending through the centrifugal governor 40 is provided with entrainment pins 62 and 63 of which one is in engagement with a longitudinal slot 64 of the outer control slide valve member 43 and of which the other is in engagement with the longitudinal slot 65 of an adjusting lever 66. The adjusting lever 66 is pivotally held in a projection 67 of the gear housing 3 and is connected with the gas pedal 69 by way of a linkage 68. The actuating linkage 70 for the output or power control member 61 of the engine is simultaneously pivotably connected with the gas pedal 69.

The pressure medium supply to the control slide valve members 42 and 43 takes place by way of a line 71 connected to the pump 21 which line 71 terminates in an annular space 72 of the slide valve housing 73. To both sides of the annular space 72, additional annular spaces 74 and 75 are provided which are adapted to be selectively connected with the annular space 72 by means of mutually coordinated spaced radial bores 76 in the outer control slide valve member 43 with the aid of control edges 77 of the inner control slide valve member 42. The annular space 74 is in communication by way of a line 78 and the annular space 75 is in communication by way of a line 79 with the cylinder space 80 of a doubly loaded control piston 81. The adjusting piston 81 is structurally combined with a speed selector slide member 82; a branching pressure line 84 is connected with the cylinder 83 of the speed selector slide member 82 which line 84 is in communication with the pump 21. The speed selector slide member 82 is in hydraulic communication by way of lines 85 and 86 with the piston 19 and 20 of the friction clutch 17 and 18, respectively, as well as by way of lines 87 and 88 with the double-acting piston 89 for actuating the band brakes 36. A further line 90 leads to the adjusting piston 91 of the band brake 35. The piston 89 is provided with a vent valve 92 having a throttle 93 terminating in the storage tank (not shown). At the same time, an annular space 94 arranged between the slide valve housing 73 and the transmission housing 3 also terminates in the storage tank, which annular space 94 drains off the leakage oil occurring at the control slide valve members 42 and 43. The leakage oil is simultaneously used for the lubrication of the members of the locking or detent device 52. The slide valve housing 73 together with the centrifugal governor 40 may be inserted into the transmission housing 3 as a single structural unit and is closed off by a cover 95.

OPERATION

If, for example, during operation of the vehicle the second gear or speed is engaged, then the control device 41 assumes the position shown in FIGURE 2 of the drawing. The pressure medium supplied by the pump 21 reaches thereby the annular space 72 by way of line 71, flows through one of openings 76 of the outer control slide valve member 43 and is conducted to the annular spaces 74 and 75 of the slide valve housing 73 past the center control edge 77 of the inner control slide valve member 42 by way of openings 76. From the annular spaces 74 and 75, the pressure medium flows by way of lines 78 and 79 to the cylinder space 80 of the adjusting piston 81 and acts upon the same simultaneously from both sides whereby the piston 81, under the effects of return spring 81', assumes the middle position illustrated in the drawing, and thereby holds the speed selector slide member 82 in a corresponding position in such a manner, that the oil which is under pressure in line 84, flows through the speed selector slide member 82 into lines 85 and 90. As a result thereof, the clutch 17 is engaged and the band brake 35 is tightened by means of the servo devices 19 and 91. The shifting members, which do not participate in the shifting operation, that is, the friction clutch 18 and the control piston 89 of the band brake 36 are vented or relieved. After the automatic course of this shifting operation, the vehicle drive takes place by way of the friction disk clutch 13 in bypassing relationship of the torque converter 1 in that the engine output is transmitted by way of the transmission input shaft 15 to the parts 26–28 of the planetary gear 2 and from the latter in a geared-down or speed reduced manner to the transmission output shaft 30.

If now, while driving in the aforementioned speed-reduction transmission ratio, by a corresponding acceleration of the engine, the weights of the centrifugal governor 40, which rotate proportionally to the transmission output speed, are forced further outwardly, then the spring dish 48 thereof pulls the clutch body 47 of the transmitter member 45 downwardly, as viewed in FIGURE 2 of the drawing, and tensions thereby the leaf-spring lamella or disk 46. An adjustment of the control slide valve member 42 initiated thereby is prevented for such length of time until the holding or retention force of spring 54 of the detent device 52 is overcome by the leaf spring 46. If this happens with a materially deviating equilibrium condition between the engine load, on the one hand, and the driving resistance, on the other, then the detent ball 53 is pushed back, whereby the slide valve member 42 slides downwardly by one step and is locked anew in the corresponding position. In this manner, the supply of pressure medium to the annular space 74 is interrupted so that the piston 81 moves toward the right while maintaining the pressure in line 79. The oppositely disposed load side of the piston 81 is relieved from the pressure medium whereby the pressure medium returns by way of the annular space 94 into the storage tank. Owing to the adjustment of the speed selector slide member 82 connected therewith, the pressure in the servo system coordinated to the band brake 35 will be reduced and the piston 20 is simultaneously actuated while keeping piston 19 actuated so that both friction clutches 17 and 18 are engaged and both band brakes 35 and 36 are disengaged. The gradual engagement of the described shifting elements is accomplished by means of throttled venting or relieving of the previously engaged shifting elements. In this manner, the third speed is engaged without interruption in the driving force, whereby, as in the second speed, the torque converter 1 is bypassed by the friction clutch 13. The bypassing of the torque converter 1 by the friction clutch 13 is carried out in a conventional manner in dependence on the position of the speed selector slide member 82.

The automatic engagement of the first speed is accomplished in the same manner in that, owing to a decrease in rotative speed of shaft 30, the flyweights of the governor 40 move together toward each other under the action of spring 49 whereby the control slide valve member 42 is pulled upwardly at a certain shifting force of the transmitter member 45 so that the detent ball 53 engages the lowest groove 51. By the thus enforced adjustment of the slide member 82 toward the left, the clutch 17 is engaged and the band brake 36 is tightened. Simultaneously therewith, the friction disk clutch 13 is disengaged so that the engine output is transmitted by way of the converter.

The shifting program as described above experiences at the same time an influence complementing the equilibrium condition, as the relative reference point, at which the control device responds (response point), is adjustable in dependence on the engine load. By depressing the gas pedal 69 during the above-described shifting operation, the control slide valve members 42 and 43 are pivoted in the circumferential direction by way of the linkage 44, 66 and 68, whereby the bracket 56 carries out an axial movement in the spirally shaped groove 59 of sleeve 58. This movement is transmitted to the linkage 44 by way of the control slide valve member 42 so that a more or less large pre-tension is imparted to the transmitter member 45, that is, the leaf spring lamella or disk 46 is bent more or less. As a result thereof, the force to be produced by the centrifugal governor 40 is increased or decreased, as the case may be, up to the response point of the shifting operation. If, for example, the vehicle in the position shown in FIGURE 2 of the drawing, is strongly accelerated for passing purposes, then the leaf spring lamella or disk 46 is tensioned by the almost complete depression of the gas pedal 69 in such a manner that the centrifugal governor 40 overcomes the counter forces of the lamella or disk 46 only at a rotational speed which lies materially above the normal engagement rotational speed. The time point of the actual shifting operation is thereby displaced so that the higher driving torque thereof is available for a larger driving range of the mentioned speed or transmission ratio. By means of the detent device 52 co-operating with the indicated cam-like control surface 57, a hysteresis action of any magnitude may be imparted upon the control device in order to obtain a characteristic as regards shifting-up of the transmission, which differs from that for the down shifting.

The invention is not limited to the illustrated embodiment. For example, the adjusting piston coordinated to the speed selector slide member may also be held in an effective position exclusively by spring force. In this case, the control slide members must be matched in such a manner that no supply of pressure medium occurs to the adjusting piston. Naturally, the adjusting piston may also be constructed as an independent structural part and may be connected with the speed selector slide member by way of a linkage or the like.

While we have shown and described one embodiment in accordance with the present invention, it is understood that the same is not limited thereto but is susceptible of numerous changes and modifications as are known to a person skilled in the art, and we therefore do not wish to be limited to the details shown and described herein but intend to cover all such changes and modifications as are encompassed by the scope of the appended claims.

We claim:
1. In a motor vehicle having an engine with an engine output control member and a change-speed transmission having shifting means for engaging the speeds thereof,
   an automatic control device for automatically shifting said transmission, comprising:
   two relatively movable control members,
   first means operatively connected with one of said control members and operable in dependence on the rotary speed of the transmission for influencing said one control member,
   second means operatively connected with the other of said control members and operable in dependence on the output control member of the engine for influencing said other control member,
   line means for supplying pressure fluid to said shifting means including speed selector slide means for selecting the speed to be engaged,
   adjusting piston means operatively connected with said speed selector slide means,
   further means for supplying pressure fluid to said adjusting piston means including one of said control members,
   and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member.

2. In a motor vehicle having an engine with an engine output control member and a change-speed transmission having shifting means for engaging the speeds thereof,
   an automatic control device for automatically shifting said transmission substantially without causing an interruption in the driving force, comprising:
   two relatively movable control members disposed substantially concentric to one another,
   first means operatively connected with one of said control members and operable in dependence on the rotary speed of the transmission for influencing said one control member,
   second means operatively connected with the other of said control members and operable in dependence on the output control member of the engine for influencing said other control member,
   line means for supplying pressure fluid to said shifting means including speed selector slide means for selecting the speed to be engaged,
   adjusting piston means operatively connected with said speed selector slide means,
   further means for supplying pressure fluid to said adjusting piston means including the one of said control members which is operable in dependence on the rotary speed of the transmission,
   said adjusting piston means being acted upon at least in one effective shifting position on both sides thereof and being held in equilibrium in said one position thereof,
   and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member.

3. In a motor vehicle having an engine with an engine output control member and a change-speed transmission having shifting means for engaging the speeds thereof,
   an automatic control device for automatically shifting said transmission, comprising:
   two relatively movable control members,
   first means operatively connected with one of said control members and operable in dependence on the rotary speed of the transmission for influencing said one control member,
   second means operatively connected with the other of said control members and operable in dependence on the output control member of the engine for influencing said other control member,
   line means for supplying pressure fluid to said shifting means including speed selector slide means for selecting the speed to be engaged,
   adjusting piston means operatively connected with said speed selector slide means,
   further means for supplying pressure fluid to said adjusting piston means including one of said control members,
   and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member,
   and means including detent means and linkage means operatively connected with said output control member for form-lockingly connecting said control members with each other in the axial as well as in the circumferential direction.

4. In a motor vehicle having an engine with an engine output control member and a change-speed transmission having shifting means for engaging the speeds thereof,
   an automatic control device for automatically shifting said transmission, comprising:
   two relatively movable control members,
   first means operatively connected with one of said control members and operable in dependence on the rotary speed of the transmission for influencing said one control member,
   second means operatively connected with the other of said control members and operable in dependence on the output control member of the engine for influencing said other control member,
   line means for supplying pressure fluid to said shifting means including speed selector slide means for selecting the speed to be engaged,
   adjusting piston means operatively connected with said speed selector slide means,
   further means for supplying pressure fluid to said adjusting piston means including one of said control members, and
   transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, and
   means including detent means and linkage means operatively connected with said output control member for form-lockingly connecting said control members with each other in the axial as well as in the circumferential direction, said detent means including detent ball means extending through the control slide member controlled in dependence on the engine output control member, movable housing means, spring means for said ball means within said housing means, and cam-like control surface means for said housing means, said housing means being supported at said cam-like control surface means to influence the spring load of the detent ball means.

5. In a motor vehicle having an engine with an engine output control member and a change-speed transmission having shifting means for engaging the speeds thereof, an automatic control device for automatically shifting said transmission, comprising:

two relatively movable control members,
first means operatively connected with one of said control members and operable in dependence on the rotary speed of the transmission for influencing said one control member,
second means operatively connected with the other of said control members and operable in dependence on the output control member of the engine for influencing said other control member,
line means for supplying pressure fluid to said shifting means including speed selector slide means for selecting the speed to be engaged,
adjusting piston means operatively connected with said speed selector slide means,
further means for supplying pressure fluid to said adjusting piston means including one of said control members, and
transmitter means operatively connected with the last-mentioned control member and influenced by the rotary speed of the transmission as well as by the position of the output regulating member in such a manner that said last-mentioned control member regulates the pressure fluid supplied to said adjusting piston means against the action of said transmitter means in a step-like manner in relation to the other control member, and
means including detent means and linkage means operatively connected with said output control member for form-lockingly connecting said control members with each other in the axial as well as in the circumferential direction, said detent means including detent ball means extending through the control slide member controlled in dependence on the engine output control member, movable housing means, spring means for said ball means within said housing means, and cam-like control surface means for said housing means, said housing means being supported at said cam-like control surface means to influence the spring load of the detent ball means,
said cam-like control surface means being provided with a spirally shaped groove, and bracket means form-lockingly connected with the control member influenced by said second means and guided within said groove, said bracket means holding said housing means in position relative to the said control surface means.

6. In a motor vehicle having an engine with an engine output control member and a change-speed transmission having shifting means for engaging the speeds thereof, an automatic control device for automatically shifting said transmission substantially without causing an interruption in the driving force, comprising:

two relatively movable control members disposed substantially concentric to one another,
first means operatively connected with one of said control members and operable in dependence on the rotary speed of the transmission for influencing said one control member,
second means operatively connected with the other of said control members and operable in dependence on the output control member of the engine for influencing said other control member,
line means for supplying pressure fluid to said shifting means including speed selector slide means for selecting the speed to be engaged,
adjusting piston means operatively connected with said speed selector slide means,
further means for supplying pressure fluid to said adjusting piston means including the one of said control members which is operable in dependence on the rotary speed of the transmission,
said adjusting piston means being acted upon at least in one effective shifting position on both sides thereof and being held in equilibrium in said one position thereof,
and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, and
means including detent means and linkage means operatively connected with said output control member for form-lockingly connecting said control members with each other in the axial as well as in the circumferential direction, said detent means including detent ball means extending through the control slide member controlled in dependence on the engine output control member, movable housing means, spring means for said ball means within said housing means, and cam-like control surface means for said housing means, said housing means being supported at said cam-like control surface means to influence the spring load of the detent ball means,
said cam-like control surface means being provided with a spirally shaped groove, and bracket means form-lockingly connected with the control member influenced by said second means and guided within said groove, said bracket means holding said housing means in position relative to the said control surface means.

7. In a motor vehicle having an engine with an engine output control member and a change-speed transmission having shifting means for engaging the speeds thereof, an automatic control device for automatically shifting said transmission, comprising:

two relatively movable control members,
first means operatively connected with one of said control members and operable in dependence on the rotary speed of the transmission means for influencing said one control member,
second means operatively connected with the other of said control members and operable in dependence on the output control member of the engine for influencing said other control member,
line means for supplying pressure fluid to said shifting means including speed selector slide means for selecting the speed to be engaged,
adjusting piston means operatively connected with said speed selector slide means, further means for supplying pressure fluid to said adjusting piston means including one of said control members, and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, said transmitter means including leaf spring means operatively connected with one of the control members, and fork-like coupling body means operatively connecting the leaf spring means with said first means.

8. In a motor vehicle having an engine with an engine output control member and a change-speed transmission having shifting means for engaging the speeds thereof, an automatic control device for automatically shifting said transmission substantially without causing an interruption in the driving force, comprising:

two relatively movable control members disposed substantially concentric to one another, first means including a centrifugal governor and operatively connected with one of said control members and operable in dependence on the rotary speed of the transmission means for influencing said one ontrol member, second means operatively connected with the other of said control members and operable in dependence on the output control member of the engine for influencing said other control member, line means for supplying pressure fluid to said shifting means including speed selector slide means for selecting the speed to be engaged, adjusting piston means operatively connected with said speed selector slide means, further means for supplying pressure fluid to said adjusting piston means including the one of said control members which is influenced by said first means, said adjusting piston means being acted upon at least in one effective shifting position on both sides thereof and being held in equilibrium in said one position thereof, and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, said transmitter means including leaf spring means operatively connected with one of the control members, and fork-like coupling body means operatively connecting the springy ends of said leaf spring means with the centrifugal governor of said first means.

9. In a motor vehicle having an engine with an engine output control member and a change-speed transmission having shifting means for engaging the speeds thereof, an automatic control device for automatically shifting said transmission, comprising:

two relatively movable control members, first means operatively connected with one of said control members and operable in dependence on the rotary speed of the transmission means for influencing said one control member, second means operatively connected with the other of said control members and operable in dependence on the output control member of the engine for influencing said other control member, line means for supplying pressure fluid to said shifting means including speed selector slide means for selecting the speed to be engaged, adjusting piston means operatively connected with said speed selector slide means, further means for supplying pressure fluid to said adjusting piston means including one of said control members, and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, linkage means for said two control members, said transmitter means including leaf spring means operatively connected with one of the control members, and fork-like coupling body means operatively connecting the leaf spring means with said first means, said leaf spring means being operatively connected with the linkage means of said control members in such a manner that the coupling body means can be connected directly with the first means.

10. In a motor vehicle having an engine with an engine output control member and a change-speed transmission having shifting means for engaging the speeds thereof, an automatic control device for automatically shifting said transmission substantially without causing an interruption in the driving force, comprising:

two relatively movable control members disposed substantially concentric to one another, first means including a centrifugal governor and operatively connected with one of said control members and operable in dependence on the rotary speed of the transmission means for influencing said one control member, second means operatively connected with the other of said control members and operable in dependence on the output control member of the engine for influencing said other control member, line means for supplying pressure fluid to said shifting means including speed selector slide means for selecting the speed to be engaged, adjusting piston means operatively connected with said speed selector slide means, further means for supplying pressure fluid to said adjusting piston means including the one of said control members which is influenced by said first means, said adjusting piston means being acted upon at least in one effective shifting position on both sides thereof and being held in equilibrium in said one position thereof, and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, linkage means for said two control members, said transmitter means including leaf spring means operatively connected with one of the control members, and fork-like coupling body means operatively connecting the springy ends of said leaf spring means with the centrifugal governor of said first means, said leaf spring means being operatively connected with the linkage means of said control members in such a manner that the coupling body means can be connected directly with the centrifugal governor of said first means.

11. In a motor vehicle having an engine with an engine output control member and a change-speed transmission having shifting means for engaging the speeds thereof, an automatic control device for automatically shifting said transmission substantially without causing an interruption in the driving force, comprising:

two relatively movable control members substantially concentric to one another, first means operatively connected with one of said control members and operable in dependence on the rotary speed of the transmission for influencing said one control member, second means operatively connected with the other of said control members and operable in dependence on the output control member of the engine for influencing said other control member, line means for supplying pressure fluid to said shifting means including speed selector slide means for selecting the speed to be engaged, adjusting piston means operatively connected with said speed selector slide means, further means for supplying pressure fluid to said adjusting piston means including the one of said control members which is operable in dependence on the rotary speed of the transmission.

said adjusting piston means being acted upon at least in one effective shifting position on both sides thereof and being held in equilibrium in said one position thereof, and transmitter means operatively connected with the last-mentioned control member and influenced by the rotary speed of said transmission as well as by the position of the output regulating member in such a manner that said last-mentioned control member regulates the pressure fluid supplied to said adjusting piston means against the action of said transmitter means in a step-like manner in relation to the other control member, and means including detent means and linkage means operatively connected with said output control member for form-lockingly connecting said control members with each other in the axial as well as in the circumferential direction, said detent means including detent ball means extending through the control slide member controlled in dependence on the engine output control member, movable housing means, spring means for said ball means within said housing means, and cam-like control surface means for said housing means, said housing means being supported at said cam-like control surface means to influence the spring load of the detent ball means, said cam-like control surface means being provided with a spirally shaped groove, and bracket means form-lockingly connected with the control member influenced by said second means and guided within said groove, said bracket means holding said housing means in position relative to the said control surface means, said transmitter means including leaf spring means operatively connected with one of the control members, and a fork-like coupling body operatively connecting the leaf spring means with said first means, said leaf spring means being operatively connected with the linkage means of said control members constituted by some of said means in such a manner that the coupling body can be connected directly with said first means.

References Cited by the Examiner

UNITED STATES PATENTS 2,329,724   9/1943   Maurer _____ 74—472

DAVID J. WILLIAMOWSKY, *Primary Examiner.*

T. C. PERRY, *Assistant Examiner.*